TEMPERATURE-COMPENSATED ELECTRIC PULSE ENCODING DEVICE

Filed June 11, 1956 3 Sheets-Sheet 1

INVENTOR.
ROBERT M. JONES
BY Lippincott & Smith
ATTORNEYS

Sept. 30, 1958 R. M. JONES 2,854,658

TEMPERATURE-COMPENSATED ELECTRIC PULSE ENCODING DEVICE

Filed June 11, 1956 3 Sheets-Sheet 2

INVENTOR.
ROBERT M. JONES

BY Lippincott & Smith

ATTORNEYS

TEMPERATURE-COMPENSATED ELECTRIC PULSE ENCODING DEVICE

Filed June 11, 1956 3 Sheets-Sheet 3

INVENTOR.
ROBERT M. JONES
BY Lippincott & Smith
ATTORNEYS 2,854,658

TEMPERATURE-COMPENSATED ELECTRIC PULSE ENCODING DEVICE

Robert M. Jones, Atherton, Calif., assignor to Admiral Corporation, Chicago, Ill., a corporation of Delaware Application June 11, 1956, Serial No. 590,466

3 Claims. (Cl. 340—354)

This invention relates to apparatus for producing a plurality of similar electric pulses in timed sequence, and in particular to an improved encoding device for providing repetitive coded sequences of electric pulses.

In an air traffic control beacon system, an encoding device is required to provide a repetitive coded sequence of electric pulses in precisely and accurately timed relation. Each sequence contains a maximum of eight substantially identical electric pulses spaced at intervals of 2.9 microseconds. The first and last pulses of each sequence are always present, but any combination of the remaining six pulses may be provided to represent information that is to be transmitted.

An electrical delay line is generally employed to establish the relative time positions of the electric pulses in each sequence. Under practical operating conditions, there may be considerable variations in the temperature of the delay line, and it has been found that such variations affect the timing of the output pulses. Accordingly, an object of this invention is to provide improved apparatus for establishing the relative time positions of electric pulses in a sequence precisely and accurately without material variations due to temperature changes. Other objects and advantages will appear as the description proceeds.

Briefly stated, in accordance with certain aspects of this invention, an improved encoding device includes a distributed-constant electrical delay line and a plurality of movable pickup coils adjustably spaced along the length of the delay line and inductively coupled thereto. A pulse generator, or the like, supplies repetitive input electric pulses to the delay line, one input pulse for each sequence of output pulses that is desired. As each input pulse travels along the delay line, it induces an electric signal in each of the pickup coils in sequence, thereby providing a plurality of electric signals in accurately timed sequence.

Selected ones of these induced signals trigger a pulse-forming circuit, such as a blocking oscillator, to provide a coded sequence of substantially identical output electric pulses. Biasing and switching means hereinafter described are provided for selecting the pickup coils that are to transmit triggering signals to the blocking oscillator, so that the sequence of output pulses can be coded to represent information that is to be transmitted. The time positions of the output pulses in each sequence relative to one another can be adjusted precisely and accurately by adjusting the positions along the delay line of respective ones of the pickup coils.

The delay characteristics of the delay line tend to vary as an inverse function of temperature (that is, as the temperature of the delay line increases, the delay time decreases) and this tends to change the time relation of the electric signals induced in the pickup coils. To solve this problem, the delay line is made with an attenuation characteristic that varies as a direct function of temperature (that is, as the temperature increases, the attenuation increases) so that there is an amplitude level of the induced signals, herein called the "cross-over level" at which the relative time positions are substantially independent of temperature. Biasing means are provided for setting the "triggering level" of the induced signals (at which the blocking oscillator is triggered to provide an output pulse) substantially at the "cross-over level," so that the relative time positions of the output pulses are substantially independent of the temperature of the delay line.

The invention will be better understood from the following detailed description taken in connection with the accompanying drawings, and its scope will be pointed out in the appended claims. In the drawings, Fig. 1 is a schematic circuit diagram of pulse encoding apparatus embodying principles of this invention;

Figure 1:
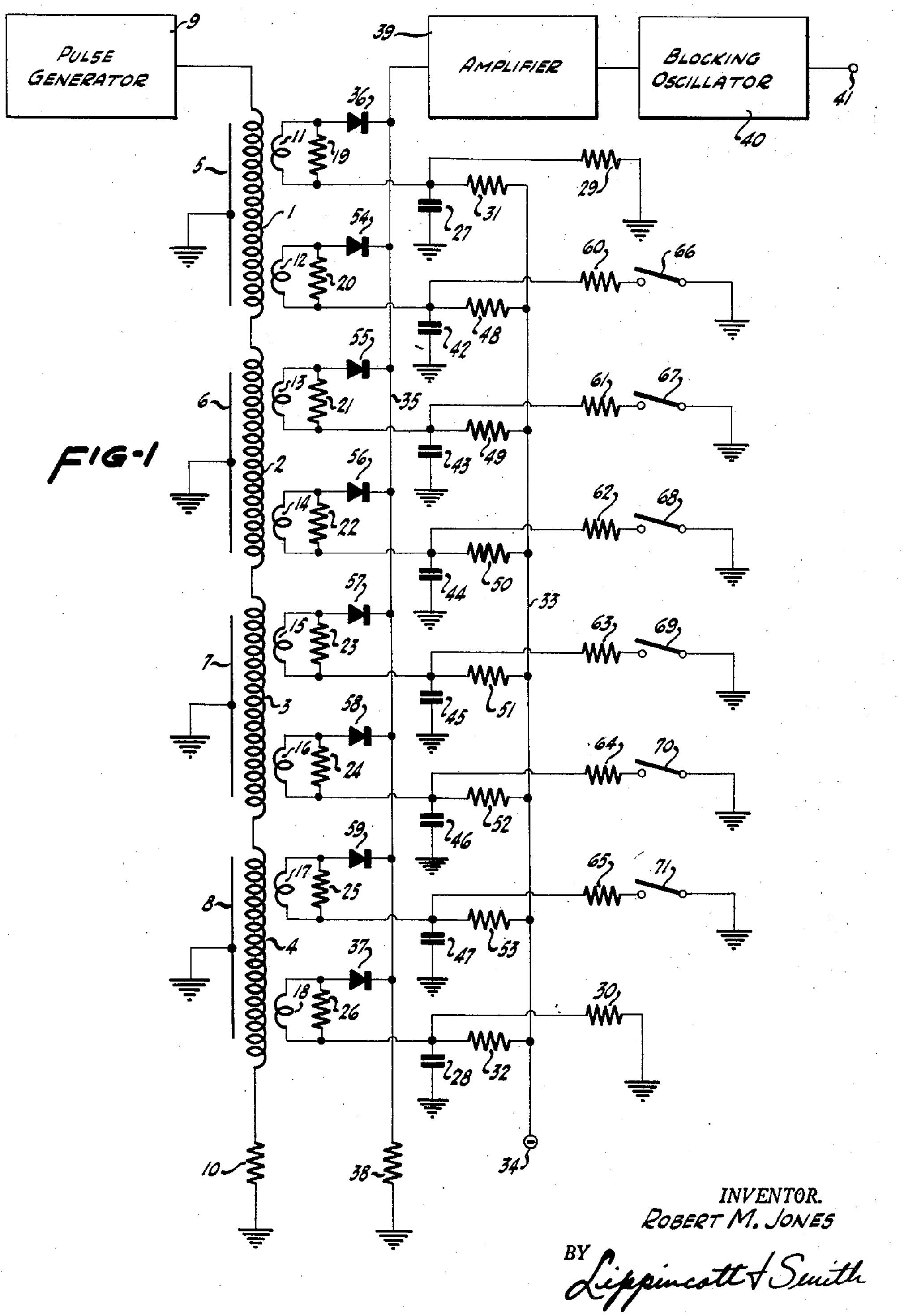

The apparatus illustrated in Fig. 1 is an encoding device used to produce repetitive coded sequences of output electric pulses for an air traffic control beacon system. Each sequence consists of a maximum of eight identical electric pulses accurately spaced in time at intervals of 2.9 microseconds. The first and last pulses of each sequence are always present, but any combination of the remaining six pulses in each sequence may be provided for the transmission of coded information.

Prior to the present invention, encoding devices for this purpose have employed lumped-constant delay lines comprising approximately 200 separate inductors, approximately 200 separate capacitors and 8 taps connected to switches or relays for selecting delay times up to about 20 microseconds with an accuracy of 0.1 microsecond, at best. Even this costly, bulky and complex delay structure heretofore used did not establish the time positions of the output pulses with sufficient accuracy to meet the requirements of the air traffic control beacon system. To achieve adequate accuracy, it was necessary to employ an additional accurately controlled pulse generator for producing clock or timing pulses that were fed through a gate circuit operated by signals obtained from the delay line taps in order to obtain output pulses in a sufficiently precise and accurate timed sequence. Consequently, the prior encoding devices were of considerable complexity, costliness and bulk.

The present encoding device consists essentially of a distributed constant delay line with a plurality of movable pickup coils adjustably spaced along its length and inductively coupled thereto, a pulse generator for supplying repetitive input pulses to the delay line so that each input pulse induces an electric signal in each of the pickup coils in sequence, the time relation of such signals depending upon the delay characteristics of the delay line and the respective positions of the movable pickup coils along the length of the delay line, and pulse-forming means, such as a blocking oscillator, triggered by a plurality of these electric signals to provide a plurality of output pulses in precisely and accurately timed sequence for each of the input pulses. The time relations of the output pulses in each sequence can be precisely and accurately adjusted by adjusting the positions of the pickup coils.

Referring now to Fig. 1 of the drawings, the delay line can conveniently be constructed of a plurality (four, for example) of delay line units or sections 1, 2, 3 and 4 connected together in series, as shown. Each delay line section consists essentially of an elongated inductive winding, having distributed series inductance and capacitance, in proximity to one or more ground strips providing substantially distributed shunt capacitance. In Fig. 1, the ground strips are represented by vertical lines 5, 6, 7 and 8, connected to ground or its circuit equivalent.

A pulse generator 9 supplies repetitive input electric pulses, one for each desired coded sequence of output pulses. Pulse generator 9 is connected to the input terminal of delay line section 1, and the input pulses are transmitted through delay line sections 1, 2, 3 and 4 in sequence with a total delay time slightly greater than 20 microseconds (about 22 microseconds for example) between the input terminal of section 1 and the output terminal of section 4. A resistor 10, preferably having a resistance substantially equal to the image impedance of the delay line, is connected to the output terminal of delay line section 4 to minimize undesirable reflections of the electric pulses transmitted by the delay line.

A plurality (eight, for example) of movable pickup coils identified in Fig. 1 by reference numerals 11 through 18 inclusive, are adjustably spaced along the length of the delay line and are inductively coupled thereto so that each electric pulse transmitted by the delay line induces an electric signal in each of the pickup coils in sequence. Consequently, for each electric pulse supplied by pulse generator 9, the eight pickup coils provide eight electric signals in timed sequence having time relations relative to one another that depend upon the delay characteristics of the delay line and the respective positions of the pickup coils along the length of the delay line. Two pickup coils may conveniently be associated with each of the four delay line sections 1 through 4, and each pickup coil is independently movable to some extent along the length of its delay line section for adjusting the time relations of the eight electric signals in each sequence. Eight loading resistors, identified in Fig. 1 by reference numerals 19 through 26 inclusive, are connected across respective ones of the eight pickup coils, as shown.

Pickup coils 11 and 18 have terminals connected to ground, or its circuit equivalent, through capacitors 27 and 28 in parallel with resistors 29 and 30. The same terminals are connected through resistors 31 and 32 to a lead 33 that is maintained at a negative bias potential by a negative potential supplied to a terminal 34 by any suitable voltage supply means (not shown). Other terminals of pickup coils 11 and 18 are connected to a lead 35 through diode rectifiers 36 and 37 poled for the conduction of current from the pickup coils to lead 35 when positive voltages are induced in the pickup coils.

Resistors 29 and 31 form a voltage divider, and resistors 30 and 32 form another voltage divider, for applying a small reverse voltage across rectifiers 36 and 37, so that only the more positive portions (alternatively, negative portions may be used by reversing the polarities of the rectifiers and bias voltages) of electric signals induced in pickup coils 11 and 18 are transmitted to lead 35. Lead 35 is connected to ground, or its circuit equivalent, through a resistor 38; and lead 35 is also connected to the input of an amplifier 39, which amplifies electric signals transmitted to lead 35 from the pickup coils. The amplified signals trigger a blocking oscillator 40 that supplies electric pulses of substantially rectangular waveform to an output terminal 41 of the encoding device.

Pickup coils 12 through 17 are connected to ground, or its circuit equivalent, through a plurality of capacitors identified by reference numerals 42 through 47, inclusive. The same terminals are connected to lead 33 through resistors identified by reference numerals 48 through 53 inclusive. Other terminals of pickup coils 12 through 17 are connected to lead 35 through diode rectifiers, identified by reference numerals 54 through 59 inclusive, poled to conduct current from the pickup coils to lead 35 when sufficiently positive voltages are induced in the pickup coils.

Connected in parallel with capacitors 42 through 47 there are a plurality of resistors, identified by reference numerals 60 through 65 inclusive, in series with a plurality of switches identified by reference numerals 66 through 71 inclusive. When switches 66 through 71 are closed, there are applied across rectifiers 54 through 59 reverse voltages that are substantially equal to the reverse voltages applied across rectifiers 36 and 37, so that the more positive portions of electric signals induced in pickup coils 12 through 17 are transmitted to lead 35 and amplifier 39 for triggering blocking oscillator 40. When switches 66 through 71 are open, the entire negative bias potential supplied at terminal 34 applies across rectifiers 54 through 59 a larger reverse voltage that is sufficiently large to block the rectifiers at all times and to prevent the transmission of any portion of the induced signals from pickup coils 12 through 17 to lead 35.

Consequently, switches 66 through 71 provide means for selectively and individually changing the magnitudes of the reverse voltages applied across rectifiers 54 through 59, to control whether or not signals induced in pickup coils 12 through 17 trigger blocking oscillator 40 to produce output pulses at terminal 41. Since switches 66 through 71 affect the bias voltages only, and are not required to transmit high-frequency signal components, the switches may, if desired, be located remotely from the remainder of the circuit.

The general operating principles of the encoding device illustrated in Fig. 1 can be explained briefly as follows: Pulse generator 9 supplies repetitive input electric pulses to the delay line at a relatively low repetition rate, the interval between successive input pulses being greater than the total delay time of the four-section delay line. As each input pulse travels down the delay line, it induces an electric signal in each of the pickup coils 11 through 18 in sequence. That is, the input pulse first induces an electric signal in pickup coil 11, then, 2.9 microseconds later, it induces an electric signal in pickup coil 12, then, another 2.9 microseconds later, it induces an electric signal in pickup coil 13, etc., so that the eight pickup coils provide eight electric signals in precisely and accurately timed sequence for each input pulse.

When all six of the switches 66 through 71 are closed, positive portions of all eight signals induced in the eight pickup coils are transmitted to lead 35 and amplifier 39, and the amplified signals successively trigger blocking oscillator 40 to provide at output terminal 41 eight substantially identical output electric pulses in timed sequence at intervals of 2.9 microseconds. When any of the switches 66 through 71 are open, corresponding ones of the triggering signals are not transmitted to lead 35 and amplifier 39, and certain pulses are missing from the output pulse sequence. Thus each input pulse produces an accurately timed sequence of output pulses consisting of a maximum of eight pulses precisely and accurately spaced at 2.9 microsecond intervals. The first and last pulses of each sequence are always present, but any combination of the other six pulses in a sequence may be produced to provide a pulse code representing information that is to be transmitted by the system.

The impedance of the eight pickup circuits is made sufficiently high that the amount of energy extracted from the delay line by each pickup coil is small, and such energy absorption does not produce undesirably large reflections of pulses transmitted by the delay line. Any reflections that are produced, either at the pickup coils or at the terminating impedance 10 or elsewhere in the delay line, result in pulses having such small amplitudes that they do not induce in the pickup coils signals of sufficient amplitude to overcome the minimum bias voltage applied across the diode rectifiers.

Furthermore, the resistance of resistor 38, which may be the input impedance of amplifier 39, is sufficiently large compared to the resistances of the loading resistors connected across the pickup coils that there is little difference in the amount of energy absorbed from the delay line by pickup coils 12 through 17 when switches 66 through 71 are open and when switches 66 through 71 are closed. This is desirable so that such energy absorption will not affect the delay characteristics of the delay line and will not materially alter the time positions of subsequent output pulses when some of the switches are opened and closed, selectively.

Figure 2:
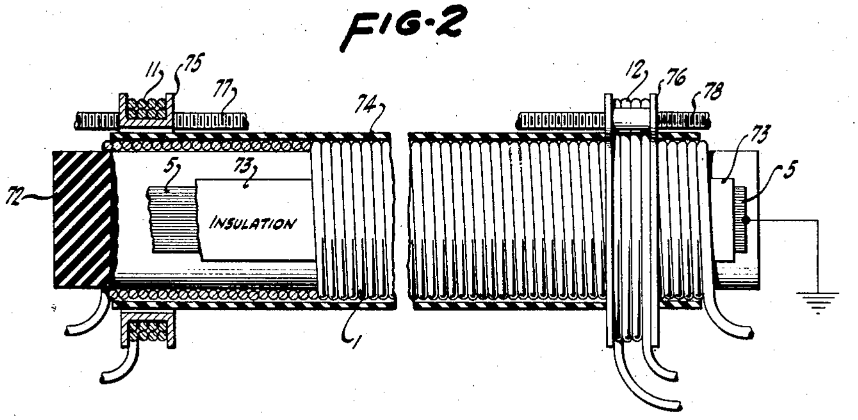
Fig. 2 is a somewhat schematic side elevation, partly in section, of a delay line and pickup coil unit that may be used in the Fig. 1 apparatus.

The construction of delay line sections 1 through 4 can be better understood by reference to Fig. 2, which illustrates one possible construction of a delay line section. An elongated cylindrical core 72 preferably is made of a low-loss electrically insulating material. The ground strip 5 may be one or more strips of metal foil extending lengthwise alongside core 72, as shown. Strip 5 may be covered by a thin sheet of insulation 73 to insulate the ground strip more effectively from the delay line winding, but in some cases insulation 73 may be omitted and the insulation between the wire and the ground strip may be provided solely by insulation covering the wire of the winding.

The delay line inductive winding 1 may be a simple helical winding of insulated wire wound about core 72 and ground strip 5, as shown. Alternatively, a multilayer winding may be employed, which preferably is of the type described and claimed in the copending patent application of Daniel A. Gillen, entitled "Electrical Delay Line," Serial No. 590,465, filed June 11, 1956, and assigned to the same assignee as the present application. A protective layer of insulation 74, and if desired additional ground strips or compensation patches, or both, may be provided around the outside of inductive winding 1, as shown.

Pickup coils 11 and 12 preferably are annular multiturn windings disposed around and coaxial with the delay line, as shown, so that each of the pickup coils is in inductively coupled relation to the delay line. Pickup coils 11 and 12 may be wound upon two insulating spools 75 and 76 that are independently movable in the lengthwise direction of the delay line for adjusting the spacing of the pickup coils to adjust the time interval between the electric signals induced therein. The positions of spools 75 and 76 are adjusted by means of lead screws 77 and 78 that pass through threaded collars attached to the spools.

Figure 3:
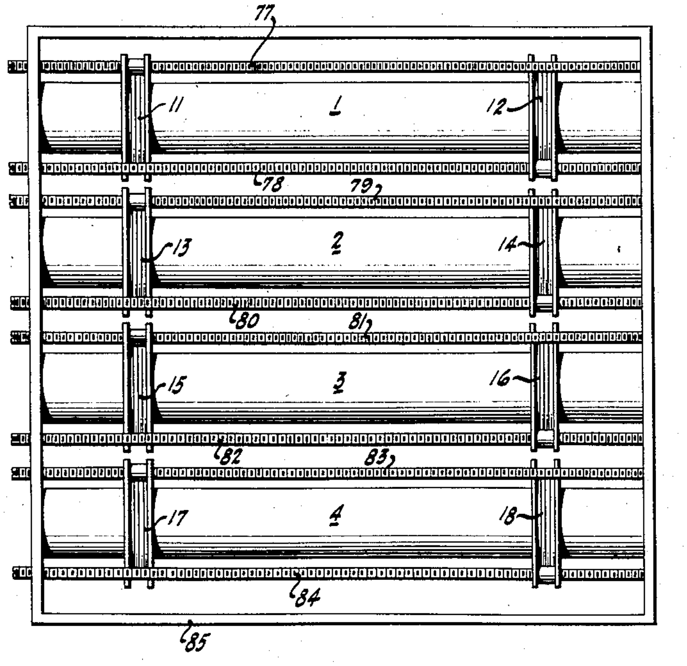
Fig. 3 is a plan view showing a compact structure wherein four of the delay line units or sections shown in Fig. 2 are arranged side-by-side to form a compact four-section delay line having eight movable pickup coils adjustably spaced along its length.

Referring now to Fig. 3 of the drawings, an exceptionally compact and economical structure may be obtained by disposing the four delay line sections 1, 2, 3 and 4 side-by-side, as shown. Two of the eight pickup coils 11 through 18 are associated with each of the four sections of the delay line, and eight lead screws, identified by reference numerals 77 through 84, are provided for individually adjusting the positions of the eight pickup coils along the delay line for accurately and precisely adjusting the time positions of the output pulses. The entire delay line and pickup coil structure may be mounted on a single chassis 85, which may be a shallow rectangular metal box or pan.

Figure 4:
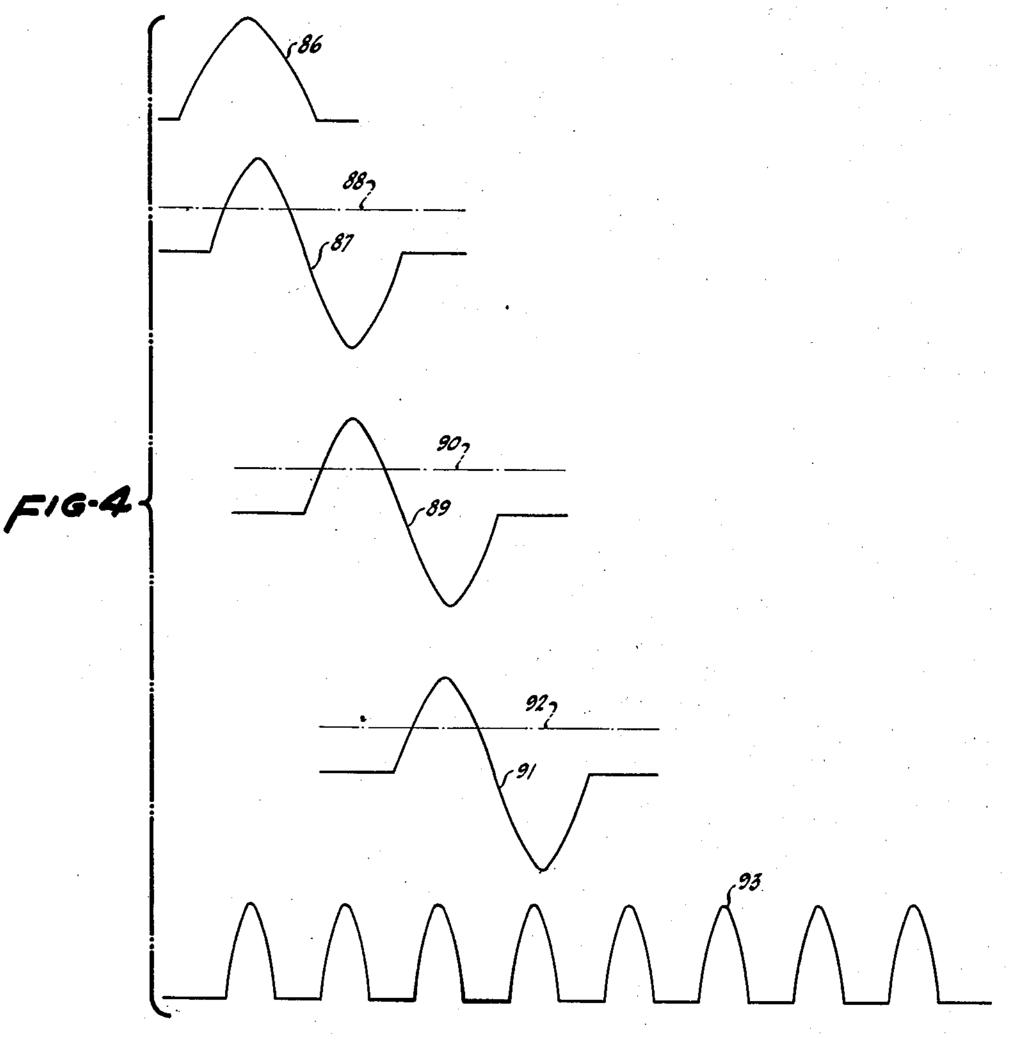
Fig. 4 is a group of curves that will be used in explaining the invention.

A better understanding of the operation of the improved encoding device may be had by reference to the curves shown in Fig. 4. Curve 86 represents an input electric pulse supplied to the delay line by pulse generator 9. Preferably each input pulse has a waveform that is substantially one-half cycle of a sine wave, as shown, to minimize waveform changes as the pulse travels down the delay line, and in particular to reduce changes in the rise time of the transmitted pulse as it travels between the input and output ends of the delay line due to restricted bandpass delay line characteristics.

As each input pulse transmitted by the delay line passes pickup coil 11, there is induced in pickup coil 11 an electric signal having a waveform, represented by curve 87, that is substantially one cycle of a sine wave. The more positive portions of this signal are transmitted through rectifier 36 to line 35, and are amplified by amplifier 39. Consequently, the portion of curve 87 above broken line 88 forms a triggering pulse that triggers blocking oscillator 40 to produce an electric pulse at output terminal 41.

Exactly 2.9 microseconds later, the input pulse induces in pickup coil 12 an electric signal having the waveform represented by curve 89. If switch 66 is closed, the portion of signal 89 above broken line 90 forms a triggering pulse that triggers blocking oscillator 40 to produce another output pulse at terminal 41. If switch 66 is open, the reverse voltage provided across rectifier 54 by the negative bias potential supplied through lead 33 is of such magnitude that no portion of the signal represented by curve 89 is transmitted to lead 35.

Similarly, another 2.9 microseconds later, the input pulse induces in pickup coil 13 an electric signal having the waveform represented by curve 91. If switch 67 is closed, the portion of curve 91 above broken line 92 forms another triggering pulse that triggers blocking oscillator 40 to produce another output pulse at terminal 41. In the same manner similar signals are induced in pickup coils 14, 15, 16, 17, and 18 as the input pulse travels down the delay line.

If all six of the switches 66 through 71 are closed, a sequence of eight identical pulses, precisely and accurately spaced in time at intervals of 2.9 microseconds, are provided at output terminal 41. Such a sequence of eight pulses is represented in Fig. 4 by curve 93. Whenever selected ones of the switches 66 through 71 are open, corresponding pulses are eliminated from the output pulse sequence to provide a coded sequence of pulses representing information that is to be transmitted. Each time that pulse generator 9 supplies another input pulse to the delay line, another sequence of output pulses is provided at terminal 41.

The time positions of the output pulses relative to one another can be adjusted with great precision by adjusting the relative positions along the delay line of the eight pickup coils. However, it is considerably more difficult to insure that these time relations will remain precisely constant in actual practice under adverse operating conditions encountered in practical air traffic control beacon installations, such as temperature variations, supply voltage variations, and the like.

For example, temperature and supply voltage variations may produce changes in amplitude of the input pulses supplied by pulse generator 9. This problem preferably is solved by providing each successive one of the pickup coils 11 through 18 with a larger number of turns than the preceding pickup coil, and by making the resistance of each successive one of the loading resistors 19 through 26 larger than the resistance of the preceding loading resistor, in the manner disclosed in the copending patent application of Howard Bleam entitled "Electric Pulse Encoding Device," Serial No. 590,464, filed June 11, 1956, and assigned to the same assignee as the present application.

Another problem arises from the fact that the delay characteristics of a delay line tend to change as an inverse function of the temperature of the delay line. The principal reason for these changes in the delay characteristic is that the wire of the delay line winding tends to expand in length as its temperature increases, and such expansion increases the spacing between the inductive winding and the ground strips so that the shunt capacitance of the line decreases.

In accordance with one aspect of the present invention, the delay line winding has a fairly large direct current resistance (about 2700 ohms, for example) that varies as a direct function of temperature. This is easy to accomplish, since any appropriate value of direct current resistance can be obtained by choice of the wire size, and the metals commonly used for electrical conductors have positive temperature coefficients of resistance.

As a result, while the delay characteristic of the line varies as an inverse function of temperature, the attenuation characteristic of the line varies as a direct function of temperature. In other words, when the temperature of the line increases, the time positions of electric signals induced in pickup coils following the first coil are advanced, and the amplitudes of such signals are decreased. However, it has been found that there is a certain amplitude level of the induced signals, herein called the "cross-over level," at which the time positions of the induced signals are substantially independent of temperature.

Figure 5:
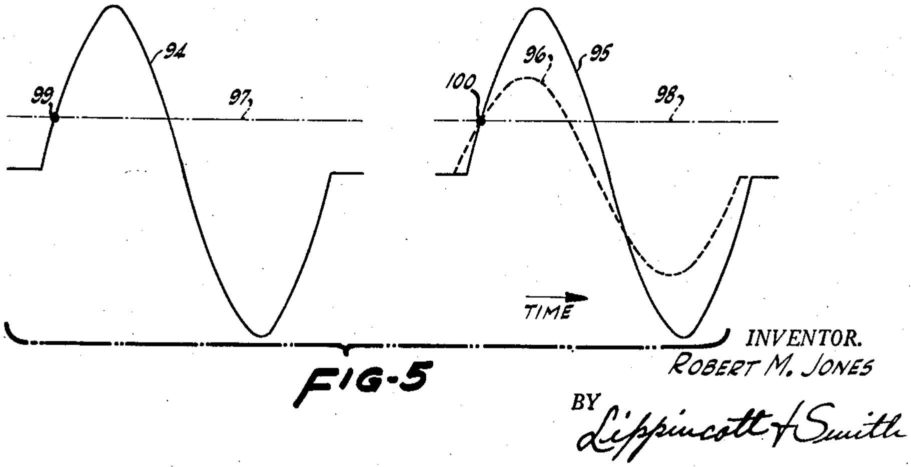
Fig. 5 is another group of curves that will be used in explaining the invention.

The foregoing can be better understood by reference to the curves shown in Fig. 5. In Fig. 5, solid curve 94 represents an electric signal induced in pickup coil 11 by an input pulse, and solid curve 95 represents an electric signal induced in pickup coil 18 by the same input pulse when the delay line is at a normal average operating temperature. Broken curve 96 represents the electric signal induced in pickup coil 18 when the temperature of the delay line is substantially greater than the aforesaid normal operating temperature. Horizontal broken lines 97 and 98 represent the "triggering level" at which the induced signals trigger blocking oscillator 40 to produce an output electric pulse. In other words, the blocking oscillator is triggered at point 99 on the waveform of curve 94, and is triggered again at point 100 on the waveform of curve 95.

As the temperature of the delay line increases, the delay time during which an input pulse travels from a point on the delay line adjacent to pickup coil 11 to a point on the delay line adjacent to pickup coil 18 decreases, as is represented in Fig. 5 by the fact that broken curve 96 is slightly advanced in time with respect to solid curve 95. The same increase in temperature also increases the amount by which the input pulse is attenuated as it travels down the delay line, as is illustrated in Fig. 5 by the reduced amplitude of broken curve 96 relative to solid curve 95.

It will be noted that the leading edges or rise portions of curves 95 and 96 cross substantially at point 100, so that at the amplitude level where the two curves cross, herein called the "cross-over level," the time position of the induced signal waveform is substantially independent of temperature. Therefore, if the "triggering level" at which the blocking oscillator is triggered by the induced signal is made to correspond substantially to the "cross-over level," the relative time positions of the output pulses are not materially affected by changes in the temperature of the delay line.

The triggering level of the induced signals is determined by the magnitude of the reverse voltages applied across the diode rectifiers when switches 66 through 71 are closed. Therefore, it is a fairly simple matter of design or adjustment (either by changing the value of the negative bias voltage supplied at terminal 34 or by changing the relative resistances of the two resistors in each voltage divider of the bias circuit) to make the "triggering level" substantially coincide with the "cross-over level."

It should be understood that this invention in its broader aspects is not limited to the specific embodiment herein illustrated and described, and that the following claims are intended to cover all changes and modifications that do not depart from the true spirit and scope of the invention.

What is claimed is:

1. Apparatus for producing a plurality of output electric pulses in timed sequence responsive to an input electric pulse, comprising an electrical delay line for transmitting the input pulse, a plurality of pickup coils spaced along the length of said delay line and inductively coupled thereto so that the input pulse as it travels along the delay line induces an electric signal in each of said pickup coils in sequence, said delay line having an attenuation characteristic that varies as a direct function of temperature and a delay characteristic that varies as an inverse function of temperature, whereby the signals induced in each of said pickup coils vary in relative amplitude and time position as functions of the temperature of said delay line, there being a "cross-over level" of said signals where the time position is substantially independent of temperature, pulse-forming means connected to receive and be triggered by a "triggering level" of said signals to provide a sequence of output pulses for each input pulse, and bias means for establishing said "triggering level" substantially at said "cross-over level," whereby the relative time positions of said output pulses are substantially unaffected by changes in the temperature of said delay line.

2. Apparatus for producing a plurality of output electric pulses in timed sequence responsive to an input electric pulse, comprising an elongated cylindrical core, a conductive ground strip extending lengthwise along a side of said core, an electrical conductor wound upon and insulated from said core and said strip to form an electrical delay line for transmitting the input pulse, two pickup coils spaced along the length of said delay line and inductively coupled thereto so that the input pulse as it travels along the delay line induces an electric signal in each of said pickup coils in sequence, said conductor being of a material that increases in electrical resistance and expands in length as its temperature increases, such expansion in length increasing the spacing and decreasing the capacitance between said conductor and said ground strips, so that said delay line has an attenuation charactristic that varies as a direct function of temperature and a delay characteristic that varies as an inverse function of temperature, whereby signals induced in the second in sequence of said pickup coils vary in relative amplitude and time position as functions of the temperature of said delay line, there being a "cross-over level" of said signals where the time position is substantially independent of temperature, pulse-producing means for producing an output electric pulse at a "triggering level" of triggering signals supplied thereto, rectifiers connecting said pickup coils to said pulse-producing means so that peak portions of said induced signals trigger said pulse-producing means to provide a sequence of output pulses for each input pulse, and means for supplying to said pickup coils bias potentials such that said "cross-over level" substantially coincides with said "triggering level."

3. An electric pulse encoding device comprising a pulse generator for supplying repetitive input electric pulses, an electrical delay line connected to said pulse generator for transmitting said input pulses, a plurality of movable pickup coils adjustably spaced along the length of said delay line and inductively coupled thereto so that each input pulse as it travels along the delay line induces an electric signal in each of said pickup coils in sequence, said delay line having an attenuation characteristic that varies directly with temperature and a delay characteristic that varies inversely with temperature so that the signals induced in said pickup coil vary in relative amplitude and time position as functions of the temperature of said delay line, there being a "cross-over level" of said signals where their time positions are substantially independent of temperature, each of said pickup coils having first and second terminals, a blocking oscillator for supplying output electric pulses, a triggering circuit for transmitting triggering signals to trigger said blocking oscillator, said blocking oscillator being triggered to produce an output pulse at a "triggering level" of said triggering signals, a plurality of rectifiers connected between respective ones of said second terminals of the pickup coils and said triggering circuit, a bias circuit connected to said first terminals of the pickup coils for applying across each of said rectifiers a reverse voltage such that only peak portions of the signals induced in said pickup coils can be transmitted to said triggering circuit, said reverse voltages being such that said "cross-over level" substantially corresponds with said "triggering level," and switching means operable to increase the reverse voltage across selective ones of said rectifiers to a value sufficient to prevent transmission of any portion of the induced signals to the triggering circuit, whereby said blocking oscillator supplies a coded sequence of output electric pulses for each input pulse.

References Cited in the file of this patent

UNITED STATES PATENTS

| | | |
|---|---|---|
| 1,456,909 | Paupin | May 29, 1923 |
| 2,659,866 | Landon | Nov. 17, 1953 |